United States Patent
Reis et al.

(10) Patent No.: US 8,714,105 B2
(45) Date of Patent: May 6, 2014

(54) PROCESS FOR APPLICATION OF ALCOHOLIC DERIVATIVE ON HEAT TREATED PELLETS FOR INHIBITION OF PARTICULATE EMISSION AND SYSTEM FOR APPLICATION OF ALCOHOLIC DERIVATIVE ON HEAT TREATED PELLETS FOR INHIBITION OF PARTICULATE EMISSION

(75) Inventors: Jose Antonio Alves E. Silva Reis, Vitoria (BR); Leonidio Stegmiller, Vitoria (BR); Aldo Gamberini, Vitoria (BR)

(73) Assignee: Vale S.A., Rio de Janeiro (BR)

( * ) Notice: Subject to any disclaimer, the term of this patent is extended or adjusted under 35 U.S.C. 154(b) by 0 days.

(21) Appl. No.: 13/088,109

(22) Filed: Apr. 15, 2011

(65) Prior Publication Data

US 2012/0247733 A1    Oct. 4, 2012

Related U.S. Application Data

(60) Provisional application No. 61/324,880, filed on Apr. 16, 2010.

(51) Int. Cl.
  *B05C 11/10* (2006.01)
  *A23G 7/02* (2006.01)

(52) U.S. Cl.
  USPC ............ 118/667; 118/712; 118/20; 118/29; 118/30

(58) Field of Classification Search
  USPC ............ 118/300, 301, 313–315, 324, 20, 30, 118/683, 666, 667, 712, 29; 75/330, 770; 119/172; 426/454
  See application file for complete search history.

(56) References Cited

U.S. PATENT DOCUMENTS

| | | | | |
|---|---|---|---|---|
| 1,887,930 A * | 11/1932 | Hatherell | | 426/6 |
| 2,468,060 A * | 4/1949 | Gunnell | | 264/4 |
| 6,086,925 A * | 7/2000 | Song et al. | | 426/3 |
| 6,159,516 A * | 12/2000 | Axelrod et al. | | 426/456 |
| 6,858,237 B1 * | 2/2005 | Wolfe et al. | | 426/3 |
| 2008/0017829 A1* | 1/2008 | Talamoni | | 252/88.1 |
| 2008/0028890 A1* | 2/2008 | Hey et al. | | 75/770 |

FOREIGN PATENT DOCUMENTS

| | | |
|---|---|---|
| PL | 0515924-5 | 8/2008 |
| PL | 0901194-3 | 1/2009 |
| PL | 0903986-4 | 1/2011 |
| WO | WO 2006/041515 | 4/2006 |

* cited by examiner

*Primary Examiner* — Yewebdar Tadesse
(74) *Attorney, Agent, or Firm* — Arent Fox LLP

(57) ABSTRACT

A process for application of alcoholic derivative on heat treated pellets for inhibition of particulate emission is provided, and the process includes weighing the amount of heat treated pellets discharged from furnaces, measuring the temperature of the heat treated pellets discharged from furnaces, applying cooling fluid on the heat treated pellets until they reach temperatures below 140° C., and spraying the alcoholic derivative on the heat treated pellets. Also provided is a first device for applying cooling fluid that is capable of calculating a dosage of cooling fluid to be applied to the heat treated pellets, a second device for applying alcoholic derivative that is capable of calculating a dosage of alcoholic derivative to be applied to the heat treated pellets already cooled, and a carrier device that continuously communicates with the first device for applying cooling fluid and with the second device for applying alcoholic derivative.

4 Claims, 5 Drawing Sheets

PROCESS FOR APPLICATION OF ALCOHOLIC DERIVATIVE ON HEAT TREATED PELLETS FOR INHIBITION OF PARTICULATE EMISSION AND SYSTEM FOR APPLICATION OF ALCOHOLIC DERIVATIVE ON HEAT TREATED PELLETS FOR INHIBITION OF PARTICULATE EMISSION

The present invention refers to a process for application of alcoholic derivative on heat treated pellets for inhibition of particulate emission during transportation, storage and shipment of these pellets. More specifically, a process for application of raw glycerin as an inhibitor product of particulate emissions is provided, the glycerin being sprayed on the pellets of iron ore transported from the heat treatment furnace for the storage yard or shipment of pellets. A system for application of alcoholic derivative on heat treated pellets for inhibition of particulate emission is also provided.

DESCRIPTION OF THE PRIOR ART

As is well known by the technician specialized in the subject, the iron ores commercialized for export are products that are in their natural form (granulated particles, sinter-feed and pellet-feed) and in their compressed form, that is, a cluster ore or pellet form ore (pellet). For this second case, conventionally, before being placed in the compartments of the ship or any other type of transport, such pellets undergo heat treatment by means of burning in the furnaces of the plants and, then, they are submitted to handling, stacking and shipping.

Although this technique is being regularly employed, there is a number of drawbacks that are generated during this process of production, among which stands out the formation of large amounts of fine particles of ore.

Studies performed on the emission of ore particulates shows that the movement of pellets is the most critical moment of the production process, because during the transfer of the same ones from the furnaces to the storage yards and from these ones to the vessels, there is a constant friction among their surfaces, a fact that ends up producing the release of fine particles that are released into the environment.

These particles in powder form ended up being taken to the outskirts of port facilities by the wind.

Thus, the villages that surround the plants and ports in the cities that have mining and pelletizing of iron ore as major economic activities, become the most affected by the intense emission of particulates into the atmosphere. Although these particulates are not harmful to the health, they tend to influence directly on aspects of local life, becoming a common drawback of the day to day, since they end up staining roofs, walls, sidewalks and other environments, besides causing eye irritation.

Likewise, the company that cause this type of pollution, for not being adapted to the requirements of environmental standards is subject to fines and lawsuits by the public agencies, in addition to its image being battered before the society in general.

It is known from the prior art, the use of water as a universal inhibitor of particulate emission, but this has low efficiency since the water evaporates when the pellets are still hot and this raises the final moisture of the pellets if they are cold.

Apart from water used as a dust suppressant, there are other products in the market for this purpose, the most common polymer agents, paraffin-based and alcoholic derivatives, such as glycerin.

The document PI 0515924-5 describes a product to prevent the generation of dust from particulate materials among other functions. This product is composed of raw glycerin, formed as a byproduct of biodiesel manufacturing process, water and water soluble salt and is used on cold surfaces or under sub-freezing temperatures. This document therefore describes a product to prevent dust generation and freezing of particulate materials prepared from the mixture of raw glycerin, water and a water-soluble salt to an extent where the glycerin ranges from 9.0% to 90% by weight, depending on the type of application.

The document PI 0901194-3 describes methods of producing dust suppressant agent derived from the chemical modification of glycerol. The glycerol in this case is commercially pure or obtained from the wastes of biodiesel production. However, for the use of this type of dust suppressant it is necessary to have stages of preparation and modification for the glycerol with the use of high temperatures so that it may allow us to achieve the desired results. Such being the case, this document refers to methods of producing dust suppressors from different processes of glycerol polymerization, either commercially pure or obtained from the waste of production of biodiesel in the form of glycerin.

The documents PI 0515924-5 and PI 0901194-3 describe products and methods for production of dust suppressants containing glycerin, but make no mention to methods which allow for the use of raw glycerin as a dust suppressant, applied in hot materials, with temperatures around 200° C.

The document PI 0903986-4 relates to a process of inhibition of particulate emission during friction of heat treated iron ore pellets and to the use of alcoholic derivate, preferably glycerin, in order to inhibit the emission of such particulates. This process includes the stage of applying glycerin mixed with an aspersion and delivery fluid, preferably water, on the pellets of then heat treated iron ore while they are still heated to a temperature of around 200° C. and, while this is reaching significant results, the formation of irritating and undesirable odors, potentially harmful to health, associated with the generation of white smoke was verified.

OBJECTIVES OF THE INVENTION

It is an exemplary objective of the present invention to provide a process for application of alcoholic derivative on heat treated pellets for inhibition of particulate emission without producing unwanted and irritating odors and prevent the formation of potentially harmful white smoke.

It is also an exemplary objective of this invention to provide a system to apply alcoholic derivative on heat treated pellets for inhibition of particulate emissions.

BRIEF DESCRIPTION OF THE INVENTION

Various aspects of the invention include a process for the application of alcoholic derivatives on heat treated pellets for inhibition of particulate emission comprising the steps of:

a) weighing the amount of heat treated pellets discharged from furnaces 500;

b) measuring the temperature of the heat treated pellets discharged from furnaces;

c) applying cooling fluid on the heat treated pellets until they reach temperatures below 140° C.; and d) spraying the alcoholic derivative on the heat treated pellets.

It is also an object of this invention a system for application of alcoholic derivative on heat treated pellets for inhibition of particulate emission comprising:

(i) a device for cooling fluid capable of calculating a dosage of cooling fluid to be applied to the heat treated pellets;

(ii) a device for applying alcoholic derivative capable of calculating a dosage of alcoholic derivative to be applied to the heat treated pellets already cooled; and (iii) a carrier device that continuously communicates with the device for applying cooling fluid and with the device for applying alcoholic derivative.

BRIEF DESCRIPTION OF DRAWINGS

Various aspects of the present invention are hereinafter more fully described based on a running example depicted in the drawings. The figures show the following items, as they are described below.

DETAILED DESCRIPTION OF THE FIGURES

Figure 1:
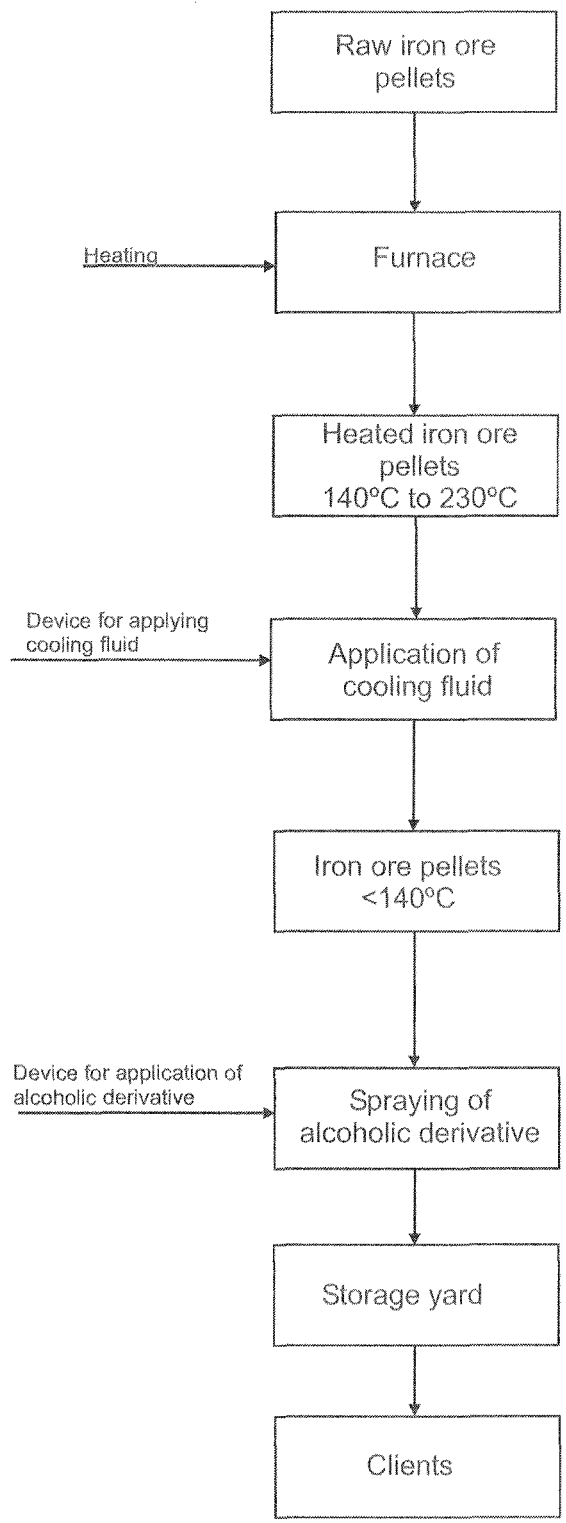
FIG. 1—represents a flowchart of a process of applying alcoholic derivative on heat treated pellets in order to inhibit the emission of particulates, object of the present invention, according to various aspects of the current invention.

According to a preferred embodiment and as can be seen from FIG. 1, aspects of the present invention relate to a process for application of an alcoholic derivative, preferably raw glycerin obtained in the process of making biodiesel, on heat treated pellets for inhibition of particulate emission during transportation, storage or shipment of such hot pellets.

According to various aspects of the current invention, the choice for applying the alcoholic derivative over hot iron ore pellets on the path between the heat treatment furnace and stacking at the storage yard is intended to reduce two major factors of origin of particulate emissions: the first factor is the stacking of the pellets at the storage yard; and the second factor is the recovery and transfer of these pellets from the yard for the loading on ships or wagons.

Figure 5:
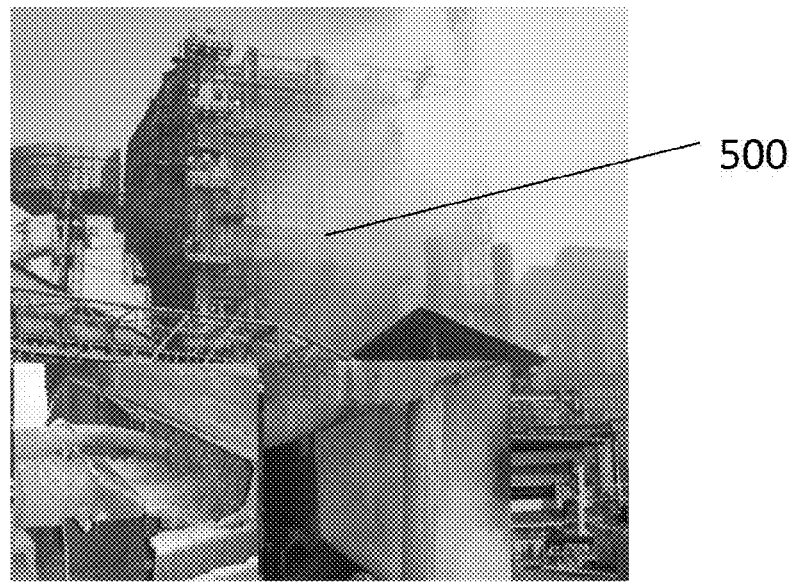
FIG. 5—is a photograph illustrating a thick smoke screen, accompanied by strong irritating and undesirable odor when an inhibitor is applied (such as glycerin) on the pellets at the exit of the furnaces, when not using the process of applying alcoholic derivative on pre-cooled pellets in order to inhibit the emission of particulates, according to an aspect of the present invention.

FIG. 5 illustrates a dense smoke screen that is accompanied by strong irritating and undesirable odor during the application of draw glycerin on the pellets at the exit of the furnaces that make the heat treatment of the same ones. It has been found on an industrial scale, that when the glycerin is applied to newly conformed pellets or pellets recently coming out of heat treatment furnaces, there is a huge incidence of white smoke with a strong irritating and undesirable odor due to the high temperature of these pellets.

Figure 2:
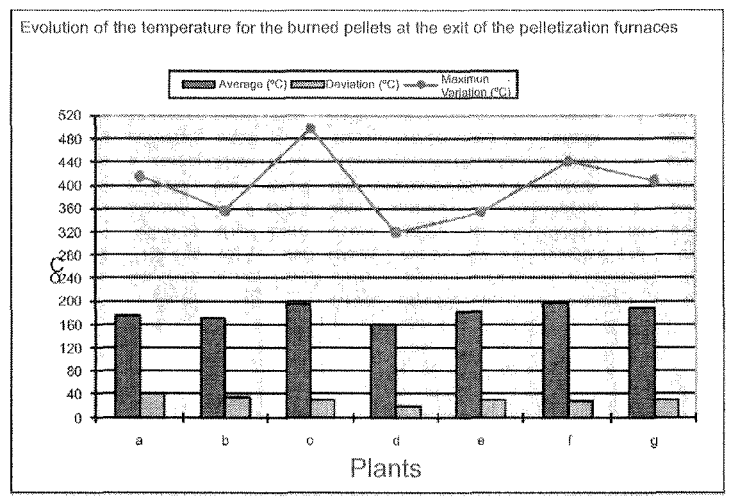
FIG. 2—represents a chart showing the mean and standard deviation of the temperature of the pellets obtained in the output of heat treatment furnaces, according to various aspects of the current invention.

In this sense, according to the chart of FIG. 2, it is verified that the temperature of the pellets exiting the heat treatment furnaces ranges from 140° C. and 230° C. It was observed that when glycerin is applied to the pellets that are above 140° C., there is formation of smoke with irritating and unpleasant odors.

From this observation made in the field, a laboratory test was performed in which at room temperature (25° C.) 100 mL of industrial glycerin was added in a metal container. The industrial glycerin has in its composition between about 13% and 15% of water. This container containing industrial glycerin was heated and its temperature was monitored by a glass rod thermometer immersed in the container. When a temperature of 100° C. and up to about 140° C. was reached, there was steam forming inside the container, according to the release of water vapor contained in the glycerin. In this case, the steam initially formed showed no irritating or strong odor.

However, when the temperature of the container reached values above 140° C., the emission of smoke characterized by a strong and irritating odor was observed, due to the catalyzation of the glycerin oxidation process by component aggregated to the glycerin.

Thus, various aspects of the process of this invention are based on the use of an alcoholic derivative, for example, glycerin, as an inhibitor of particulate emissions on the heat treated iron ore pellets; however, the temperature of these pellets is suitable during this process so that no emission of smoke with irritating and unwanted odors, potentially harmful, occur.

This process for application of an alcoholic derivative on heat treated pellets for inhibition of particulate emission comprises the steps of:

a) weighing the amount of heat treated pellets discharged from furnaces;

b) measuring the temperature of the heat treated pellets discharged from furnaces;

c) application of cooling fluid on the heat treated pellets until they reach temperatures below 140° C.; and d) spraying the alcoholic derivative on the heat treated pellets.

According to various aspects of the current invention, the pellets of crude iron ore are placed in a furnace to be heat treated or burned. The maximum burning temperature is held at the order of 1350° C. and when cooled at the furnace exit, it reaches values between about 140° C. and 230° C.

According to various aspects of the current invention, the iron ore pellets are then removed from the furnace and unloaded on a conveyor belt, which directs these heat treated pellets to a scale or similar equipment, to be weighed and, subsequently, the temperature measurements of these heat treated pellets takes place.

According to various aspects of the current invention, after obtaining the weight and temperature data, a calculated amount of cooling fluid, preferably 2% to 10% on the weight of measured pellets, is applied to the heat treated pellets until they reach temperatures below 140° C. The cooling fluid is preferably water, but process water can also be used. This step of cooling the heat treated pellets has the function of ensuring that the next step, the step of spraying alcoholic derivate on these pellets, will not cause emission of irritating and undesirable odors or white smoke. Thus, after the step of applying the cooling fluid, the heat treated pellets and now under the temperatures below 140° C. go through the conveyor belt to another scale or similar equipment for weighing the cooled pellets and dosage calculation of alcoholic derivate to be applied on the pellets.

According to various aspects of the current invention, the step of spraying the alcoholic derivative on the heat treated pellets occurs soon after the cooling step. In this case, the alcoholic derivative to be used is in preference raw glycerin obtained in the process of manufacturing biodiesel. There is preferably applied 500 grams of glycerin per ton of iron ore pellets, and this dosage can be adjusted between 100 g/ton to 1000 g/ton, not being limited to these values.

According to various aspects of the current invention, the alcoholic derivative is then mixed with an application fluid, preferably water, this one in the ratio of 2% to 10% over the mass of pellets, resulting in dilution of 2.5% to 0.5%. The physical processes of water evaporation due to the heat of the pellets, the natural evaporation due to vapor pressure of glycerin hygroscopically will define the final moisture contents of the pellet. Thus, it is possible to inhibit the emission of smoke at low dilution, about 0.5 kg/ton of pellet.

According to various aspects of the current invention, after applying the glycerin on the heat treated and cooled pellets, they are ready to be transported, stored or shipped, without occurring the emission of particles or the presence of irritating and unwanted odors and with moisture adequate to customer's specifications.

As a result, subsequent processes of combatting particulate emissions are no longer needed, preventing uncontrolled final moisture of shipment and excessive expenses for cooling fluid, such as water, for example.

According to various aspects of the current invention, the process of this invention may be used in pellets derived from processes of iron ore pelletization; however, it can be applied together with other unit operations in other processes of mining or others, where there is the emission of particulates.

It is also a purpose of this invention, according to various aspects, to provide a system for application of an alcoholic derivative on heat treated pellets for inhibition of particulate emission.

Figure 3:
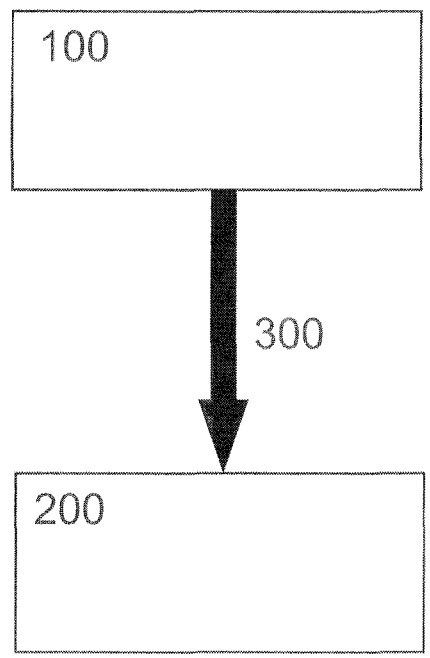
FIG. 3—represents a flowchart of a method for the application of alcoholic derivatives on heat treated pellets for inhibition of particulate emission, object of the present invention, according to various aspects of the current invention.

As illustrated in FIG. 3, the system comprises:

(i) a device for applying cooling fluid 100 capable of calculating a dosage of cooling fluid to be applied to the heat treated pellets;

(ii) a device for applying alcoholic derivative 200 capable of calculating a dosage of alcoholic derivative to be applied to the heat treated pellets already cooled; and (iii) a carrier device 300 that continuously communicates with the device for applying cooling fluid 100 and with the device for applying alcoholic derivative 200.

According to various aspects of the current invention, the carrier device 300 may include a conveyor belt that receives the heat treated pellets discharged from the furnace and takes them primarily to the device for applying cooling fluid 100. This device for applying cooling fluid 100 may include a scale 101 or a similar equipment that provides continuous measurements of the weight of the heat treated pellets and a temperature gauge 102, which continuously measures the temperature of the pellets coming straight out of the oven.

According to various aspects of the current invention, the device for applying cooling fluid 100 may include a cooling fluid dosing device 103 that is controlled by a programmable logic computer (PLC) 400, from the signals sent to this PLC 400 by the scale 101 or similar equipment and by the temperature gauge 102. So, according to obtained data of weight, temperature and outflow, a correct dosage of cooling fluid, preferably water, is applied to the heat treated pellets and transported by the conveyor belt, in order to cool these heat treated pellets until they reach the ideal desired temperature, with values below 140° C.

According to various aspects of the current invention, after cooling the heat treated pellets, they are carried by a conveyor belt 300 to the device for applying alcoholic derivative 200.

This device for applying alcoholic derivative 200 may include a scale 201 or similar equipment that continuously provides the measurement of the weight of the heat treated pellets, which are cooled, and a dosage pump 202 which is controlled by the PLC 400 from the signals sent to this PLC 400 by the scale 201 or similar equipment. Thus, according to various aspects of the current invention, depending on the obtained weight data, a recommended amount of alcoholic derivative, preferably raw glycerin, is applied to the heat treated and cooled pellets.

According to various aspects of the current invention, the steps of cooling the load of pellets and application of the alcoholic derivative, preferably glycerin, are controlled by a PLC 400 that operates according to a previously planned, tested and implemented logic, where weight and temperature sensors generate parameters that are the main inputs of the logic system.

These parameters command valves of coolant and pumps of alcoholic derivative, which may act unsynchronized from the signals received, depending on the distance among the sensors and the respective additions, as well as the speed of cargo transportation of pellets on the conveyor belts 300, such that in some aspects the proportions defined between the coolant/alcoholic derivative and pellet load remain constant, regardless of variations of this load.

DESCRIPTION OF CONTROL PROCESS

According to various aspects of the current invention, the control process of the correct dosage of cooling fluid and the correct dosage of alcoholic derivative in the system for application of alcoholic derivative on the heat treated pellets to inhibit the emission of particulates may be automated in order to ensure accurate measurements and dosages. For this, the PLC 400 receives input data, processes such data according to pre-set parameters and delivers output data that operate valves and pumps that ensure the accuracy of the system.

In this sense, according to various aspects of the current invention, the step of applying the cooling fluid may include the following commands:

1) Reading of the mass outflow of pellets through the scale 101 and reading of the temperature of the pellets through the temperature gauge 102;

2) Sending collected outflow and temperature data to the PLC 400;

3) The PLC 400 makes the calculation of the outflow of coolant based on the percentage defined in the set point of the coolant, that is, according to the information pre-determined and programmed into the PLC 400;

4) Application of the cooling fluid on the pellets to be cooled through a control valve for the cooling fluid 104, which constantly receives and sends outflow data on the cooling fluid 105 that are also monitored by the PLC 400;

5) If the temperature is higher than 140° C., the PLC 400 increases the outflow of water by the time the pellets reach temperatures below 140° C. This constant monitoring and control are done by the temperature gauge 102 and control valve of cooling fluid 104 from the data of out flow of cooling fluid 105.

According to various aspects of the current invention, the step of applying alcoholic derivative and fluid application may include the following step:

The alcohol derivative such as, for example, glycerin, is diluted in water and then applied on the pellets.

For the application of alcoholic derivative and application fluid, the PLC 400 may effect a closed loop control in order to ensure that the exit outflows are obeying the determined set points.

According to various aspects of the current invention, 500 grams of glycerin per ton of iron ore pellets may be applied, and this proportion can be adjusted between 100 g/ton to 1000 g/ton, without the current invention to be limited to these values.

So, in a first step, the PLC 400 may receive the set point data of the application fluid 204, preferably water, and the set point data of the alcoholic derivative 205, preferably glycerin.

Glycerin and water may then be mixed sprayed on the pellets, with the dilution of glycerin at 2.5% to 0.5%.

According to various aspects of the current invention, the control of the dosage of application fluid, water, is done through a control valve for fluid application 206 from outflow data of this application fluid 207. Likewise, the control of the dosage of the alcoholic derivative, glycerin, is done through a dosage pump of alcoholic derivative 202, from the specific outflow data of alcoholic derivative 208.

Figure 4:
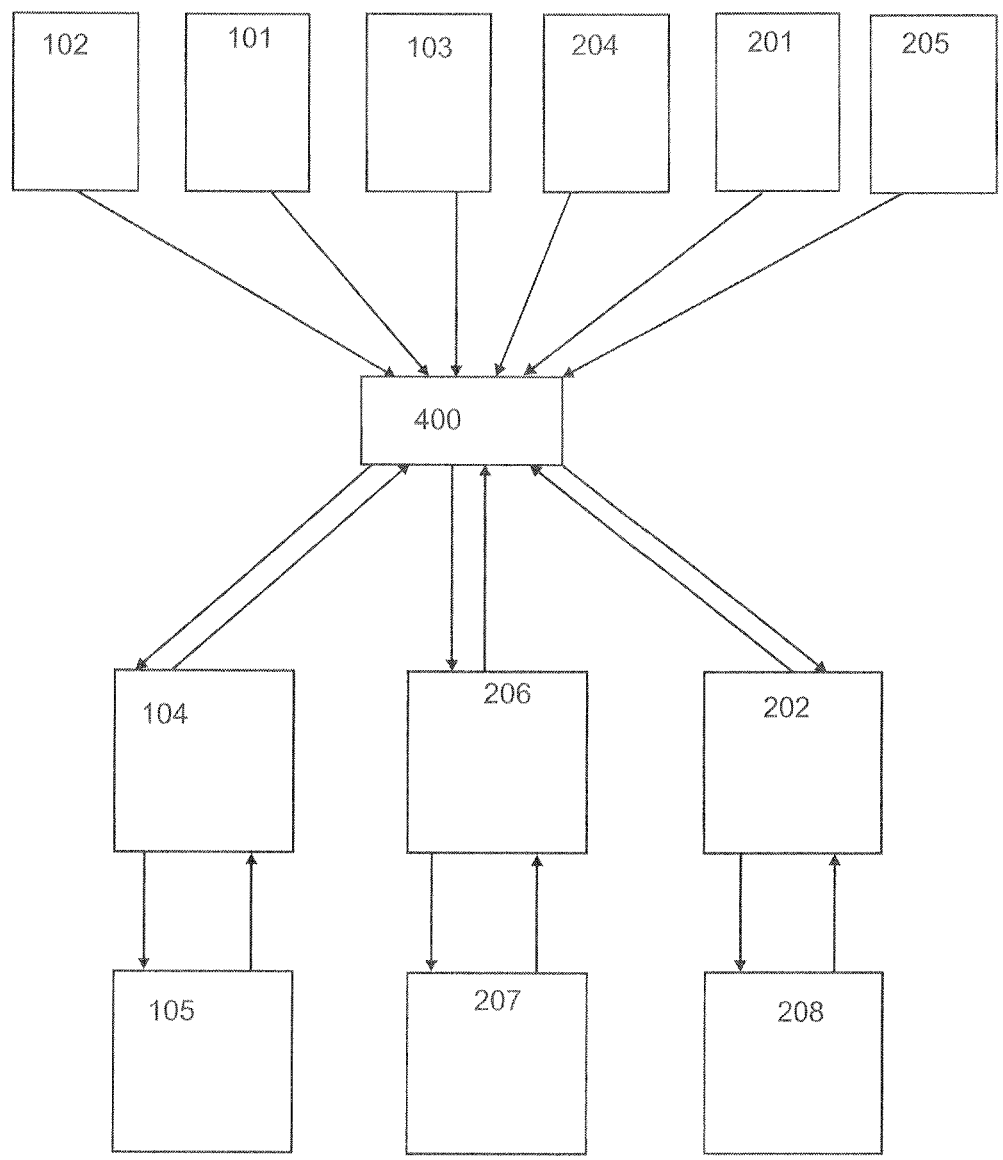
FIG. 4—is a photograph represent a schematic diagram of the cooling fluid dosage control process and the alcoholic derivative dosagem control, according to various aspects of the current invention.

All controls described above may be commanded by programming of the PLC 400, as illustrated in FIG. 4.

Figure 6:
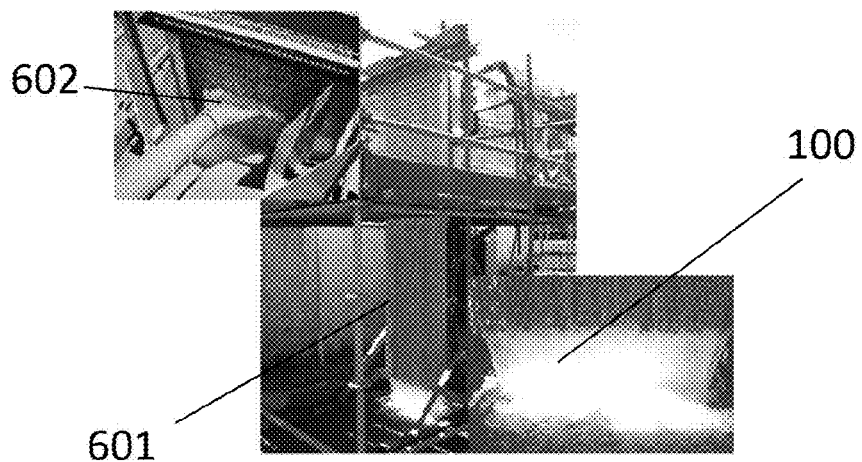
FIG. 6—is a photograph illustrating a version of the aerated percolation equipment used in the application of cooling fluid as well as in the application of alcoholic derivative on the surface of hot and cooled pellets, respectively, in an aspect object of the present invention.
Figure 7:
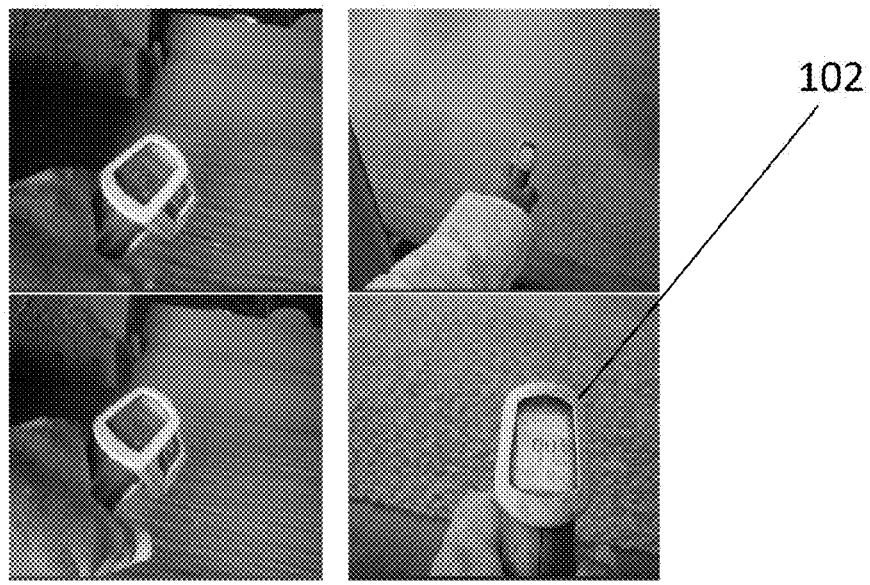
FIG. 7—is a photograph illustrating the measurements of temperatures before and after the cooling phase.
Figure 8:
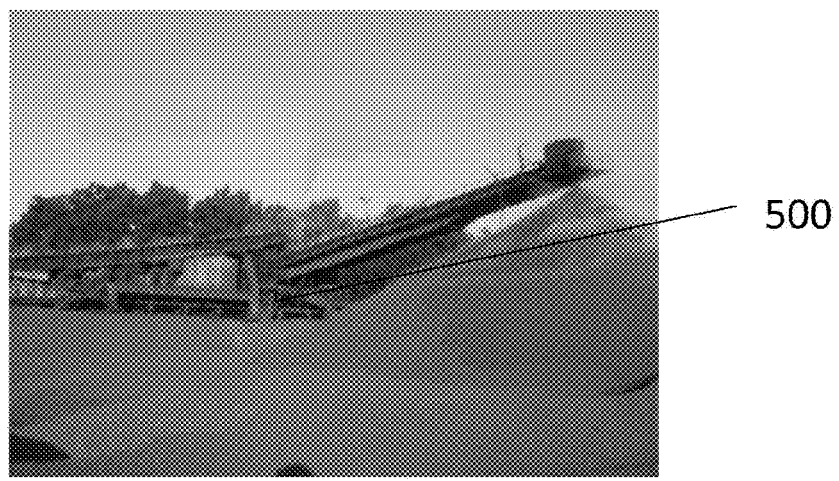
FIG. 8—is a photograph illustrating the industrial test result obtained with the cooling step inserted in the process, avoiding the generation of unwanted and irritants odors, as well as smoke generation.

According to various aspects of the current invention, the applications of cooling fluid and the alcoholic derivative on the heat treated pellets are made through two equipment of aerated percolation, each one of these apparatus comprising a disperser nozzle 602 and a set of chains 601 forming a curtain of chains in suspended links, with the purposes of aerating liquids through the generation and trapping of air bubbles. FIG. 6 illustrates this equipment.

According to various aspects of the current invention, the use of this aerated percolation equipment is well suited and convenient, as it promotes the formation of foam from the cooling fluid and the application fluid of alcoholic derivative, combined with an application fluid, reducing the heat shock, inhibiting the emission of addition powder, as well as evenly distributing the fluid to the load, allowing, also, that the pellets of the lower section of the belt may receive these fluids, significantly increasing the degree of application uniformity. Consequently, they advantageously replace the usual system of nozzles, which generate dust in addition to the high pressure and velocity of the fluids, as well as are highly prone to clogging and premature wear and tear.

Having described various aspects of the current invention, it should be understood that the scope of the present invention embraces other possible variations, being limited solely by the wording of the claims, including the possible equivalent items.

What is claimed:

1. A system of application of an alcoholic derivative on heat treated pellets for inhibition of particulate emission comprising:
    a first device for applying cooling fluid, the first device being configured to calculate, via a programmable logic controller (PLC), a dosage of the cooling fluid to be applied to the heat treated pellets, wherein the first device comprises a scale, a temperature gauge, and a cooling fluid feeder associated with the PLC;
    a second device for applying the alcoholic derivative, the second device being configured to calculate, via the PLC, a dosage of the alcoholic derivative to be applied to the heat treated pellets already cooled, wherein the second device comprises a scale and pump feeder associated with the PLC; and
    a carrier device that continuously communicates with the first device and with the second device.

2. The system according to claim 1, wherein the carrier device comprises a conveyor belt interconnecting the first device to the second device.

3. The system according to claim 1, further comprising aerated percolation equipment for application of cooling fluid and application of alcoholic derivative on the heat treated pellets.

4. The system of claim 1, wherein:
    the cooling fluid is applied on the heat treated pellets by the first device until the heat treated pellets reach a temperature below 140° C.; and
    100 g to 1000 g of the alcoholic derivative is applied per ton of heat treated pellet by the second device.

* * * * *